United States Patent [19]

Pierce

[11] 4,378,922

[45] Apr. 5, 1983

[54] AIRCRAFT HAVING IMPROVED STRAKE CONFIGURATION

[75] Inventor: Donald Pierce, Aldershot, England

[73] Assignee: The Secretary of State for Defence in Her Brittannic Majesty's Government of the United Kingdom of Great Britain and Northern Ireland, London, England

[21] Appl. No.: 252,102

[22] Filed: Apr. 8, 1981

[30] Foreign Application Priority Data

Apr. 18, 1980 [GB] United Kingdom ............... 8012872

[51] Int. Cl.$^3$ .................... B64C 1/26; B64C 23/06
[52] U.S. Cl. ............................ 244/199; 244/45 A; 244/130
[58] Field of Search ............... 244/3.24, 45 A, 117 R, 244/119, 130, 198, 199, 200, 53 B; D12/331, 332, 333, 334

[56] References Cited

U.S. PATENT DOCUMENTS

| 2,694,357 | 11/1954 | Lee ..................................... 244/53 B |
| 3,333,794 | 8/1967 | Lewis .................................. 244/53 B |
| 3,744,745 | 7/1973 | Kerker et al. ....................... 244/199 |
| 4,176,813 | 12/1979 | Headley et al. ..................... 244/130 |
| 4,225,102 | 9/1980 | Frosch et al. ....................... 244/130 |

FOREIGN PATENT DOCUMENTS 1522282 4/1968 France .............................. 244/45 A Primary Examiner—Charles E. Frankfort
Attorney, Agent, or Firm—Pollock, Vande Sande & Priddy

[57] ABSTRACT

An aircraft has a series of strakes in the form of laterally projecting barbs (low aspect ratio semi-delta type aerofoils) extending longitudinally rearwards from and on each side of the nose, each barb lying substantially parallel to the longitudinal axis.

3 Claims, 2 Drawing Figures

AIRCRAFT HAVING IMPROVED STRAKE CONFIGURATION

The present invention relates to aircraft of the fighter type.

Modern fighter aircraft usually have a considerable length of fuselage extending forward of the wings. It is becoming the practice for such aircraft to be maneuvered at very high angles of attack (greater than 45°, for example). At these angles the aircraft frequently become laterally unstable. It is believed that the instability arises from vortices being shed from the nose portion (that portion ahead of the wing leading edge), the vortices from the laterally opposite sides of the nose being shed at different times, and so imparting side forces to the nose portion.

Several methods of combating the problem have been attempted, including the use of normal strakes and of helically wound projections from the nose portion of the fuselage. None of these has proved entirely successful.

According to the present invention an aircraft has a longitudinal axis, a nose, and a series of strakes in the form of laterally projecting barbs extending longitudinally rearwards from and on each side of the nose, each barb lying substantially parallel to the longitudinal axis.

The barbs (each of which is a low aspect ratio semi-delta type aerofoil) may lie in a continuous line, or each may be slightly offset vertically relative to its neighbors. The latter arrangement may be useful with some aircraft designs where the nose maximum lateral dimension varies vertically along the longitudinal axis.

One example of the invention will now be described by way of example only, with reference to the accompanying diagrammatic drawings, of which:

Figure 1:
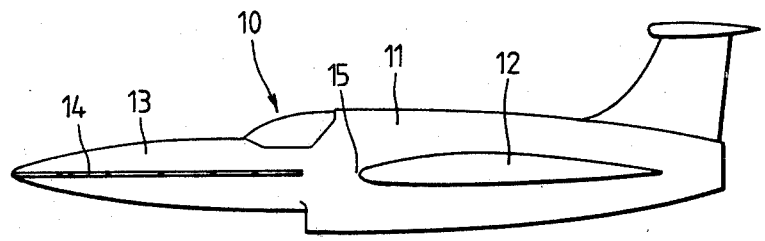
FIG. 1 is an elevation of an aircraft employing the present invention.

An aircraft, generally indicated at 10, has a fuselage 11 and wings 12. A nose portion 13 extends forward of leading edges 15 of the wings 12 by a distance which is a substantial fraction of the overall fuselage length.

On each side of the nose portion 13 is positioned a series of strakes 14, each strake being in the form of a barb, extending rearwardly from the leading point of the nose.

When the aircraft is flying at a high angle of attack, for example when the relative air flow is approaching from a direction such as that illustrated by the arrow X in FIG. 1, vortices are forced to shed themselves at trailing edges of barbed strakes 14. With this arrangement each vortex is comparatively weak, and vortices on laterally opposite sides of the nose portion 13 are shed substantially in synchronization. Unwanted side forces are therefore reduced, and the lateral stability of the aircraft is improved.

Figure 2:
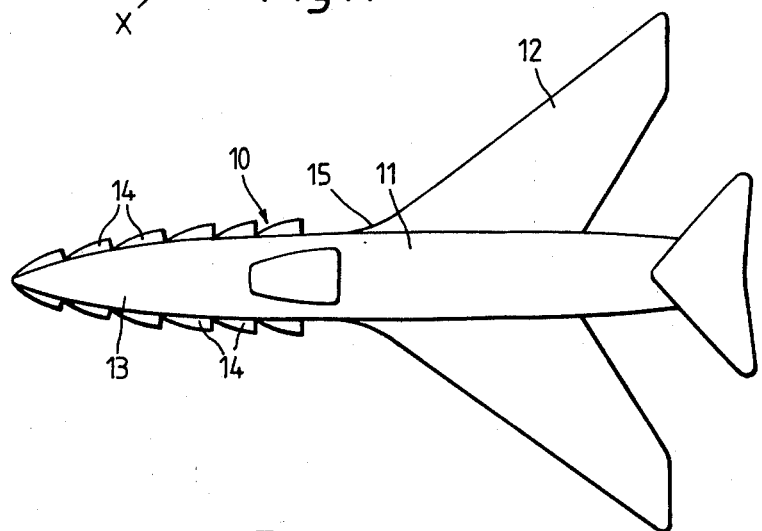
FIG. 2 is a plan view of the aircraft illustrated in FIG. 1.

It will be realised that while the barbed strakes 14 as described and illustrated with reference to FIGS. 1 and 2 extend in a substantially continuous longitudinal line from the leading point of the nose, alternative arrangements are possible. For example each strake 14 might be slightly vertically displaced relative to strakes 14 ahead of and behind it. The disposition, and length of strakes 14 for maximum beneficial effect will depend on the detailed design of a particular aircraft to which they are attached.

What is claimed is:

1. An aircraft having a longitudinal axis, a nose, and a series of laterally projecting barbs extending longitudinally rearwards from and on each side of the nose without adjacent barbs in the series vertically overlying one another, each of said barbs being in the form of a low aspect ratio semi-delta type aerofoil, and each barb lying substantially parallel to the aircraft longitudinal axis.

2. An aircraft as claimed in claim 1 wherein the barbs in each of said series of barbs lie in a continuous line.

3. An aircraft as claimed in claim 1 wherein each barb in each of said series of barbs is slightly offset vertically relative to an adjacent barb in said series.

* * * * *